(12) United States Patent
Kim et al.

(10) Patent No.: US 10,663,772 B2
(45) Date of Patent: May 26, 2020

(54) ACTIVE LENS STRUCTURE AND METHOD OF MANUFACTURING THE SAME

(71) Applicant: KYUNGPOOK NATIONAL UNIVERSITY INDUSTRY-ACADEMIC COOPERATION FOUNDATION, Daegu (KR)

(72) Inventors: Hak-Rin Kim, Daegu (KR); Ji-Sub Park, Gumi-si (KR); Min-Kyu Park, Daegu (KR)

(73) Assignee: KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 117 days.

(21) Appl. No.: 16/089,856

(22) PCT Filed: Nov. 17, 2016

(86) PCT No.: PCT/KR2016/013283
§ 371 (c)(1),
(2) Date: Sep. 28, 2018

(87) PCT Pub. No.: WO2017/171190
PCT Pub. Date: Oct. 5, 2017

(65) Prior Publication Data
US 2019/0086695 A1 Mar. 21, 2019

(30) Foreign Application Priority Data
Apr. 1, 2016 (KR) .................... 10-2016-0040238

(51) Int. Cl.
G02F 1/133 (2006.01)
G02F 1/01 (2006.01)
(Continued)

(52) U.S. Cl.
CPC ............ *G02F 1/0136* (2013.01); *G02F 1/137* (2013.01); *G02F 1/1341* (2013.01);
(Continued)

(58) Field of Classification Search
None
See application file for complete search history.

(56) References Cited

FOREIGN PATENT DOCUMENTS

| JP | 2013015754 | 1/2013 |
|----|------------|--------|
| KR | 20080001141 | 1/2008 |

(Continued)

OTHER PUBLICATIONS

International Search Report—PCT/KR2016/013283 dated Mar. 7, 2017.

*Primary Examiner* — Richard H Kim
(74) *Attorney, Agent, or Firm* — Cantor Colburn LLP

(57) ABSTRACT

Provided is an active lens structure. The active lens structure has a configuration in which a polarization switching section and a polarization dependent lens section are integrally formed, wherein a lattice structure is formed on an upper surface of a liquid crystal phase polymer layer of the polarization dependent lens section, and the liquid crystal phase polymer layer is aligned in a top-down manner and is used as a lower alignment film of a liquid crystal layer. Therefore, the polarization switching section of the active lens structure can be fabricated without any lower alignment film and any lower glass substrate, so that it is possible to minimize the total thickness and simplifying the manufacturing process.

8 Claims, 7 Drawing Sheets

(51) Int. Cl.
*G02F 1/1335* (2006.01)
*G02F 1/29* (2006.01)
*G02F 1/1333* (2006.01)
*G02F 1/1337* (2006.01)
*G02F 1/1341* (2006.01)
*G02F 1/1343* (2006.01)
*G02F 1/137* (2006.01)
G02B 3/14 (2006.01)
G02B 30/25 (2020.01)
G02B 30/27 (2020.01)

(52) U.S. Cl.
CPC .... *G02F 1/13439* (2013.01); *G02F 1/133345* (2013.01); *G02F 1/133365* (2013.01); *G02F 1/133526* (2013.01); *G02F 1/133711* (2013.01); *G02F 1/134336* (2013.01); *G02F 1/29* (2013.01); G02B 3/14 (2013.01); G02B 30/25 (2020.01); G02B 30/27 (2020.01); G02F 2001/133726 (2013.01); G02F 2203/07 (2013.01)

(56) References Cited

FOREIGN PATENT DOCUMENTS

| | | |
|---|---|---|
| KR | 101331540 | 11/2013 |
| KR | 20140140661 | 12/2014 |
| KR | 20140141877 | 12/2014 |
| KR | 20150063246 | 6/2015 |
| KR | 20150130807 | 11/2015 |

$n_o = n_p$
(Index matching)
(a)

$n_e > n_p$
(Index mismatching)
(b)

⟷ X-axis
● Y-axis (a)

(b)

ACTIVE LENS STRUCTURE AND METHOD OF MANUFACTURING THE SAME

TECHNICAL FIELD

The present invention relates to an active lens structure, and more particularly, to an active lens structure in which a polarization switching section and a polarization dependent lens section are integrally formed and which can be used for a non-glass 3D display to switch driving to a lens by controlling a polarization direction of incident light and a method of manufacturing the active lens structure.

BACKGROUND ART

Recently, increasing attention has been paid to 3D display devices. Such 3D display devices are classified into a stereoscopic type using a binocular parallax method, an integrated image type, a holographic type, a volumetric 3D display type, and the like according to the implementation methods. Among these types, the stereoscopic type display devices are divided into a glass type using glasses to implement 3D display and a non-glass type using no glasses. In general, the type of implementing the 3D display without glasses is called an auto-stereoscopic 3D display, which includes a multi-view display and an integrated video display.

With respect to non-glass 3D display device. In order to support both 2D video and 3D video, the display device needs to be implemented in a form of capable of selecting 2D and 3D modes. In order to implement this form, various techniques have been developed. One of the techniques is to form, on a 2D display, a lens array structure that is actively driven as a lens only when a viewer views a 3D image. As representative techniques for realizing such an active lens, there area method using an electrowetting effect and a method using an electro-optic effect of a liquid crystal.

In the case of a multi-view 3D display using a lens array, a 3D image can be implemented with almost no reduction in luminance. In the case of implementing only horizontal parallax, a 1D array of microlenses is applied. In the case of implementing horizontal parallax and vertical parallax, a 2D array of microlenses is applied.

As described above, among the active liquid crystal lens techniques that can be used for a 2D/3D switchable display device capable of selecting one of 2D and 3D, there is a polarization dependent liquid crystal lens technique in which light collection characteristics vary depending on an alignment direction of a liquid crystal layer constituting the lens and polarization of incident light. By using this, the polarization condition of the light emitted from a 2D image display panel and incident on a polarization dependent liquid crystal lens layer is changed, so that the 2D or 3D image can be selectively displayed.

In particular, since a viewing distance is as short as about 35 to 40 cm in a 3D mobile display, a focal length of the lens array needs to be as short as about 1 mm or less. Therefore, a gap between the display panel and the lens array also needs to be reduced.

On the other hand, as one of the active lens techniques for 2D/3D image switching, in a liquid crystal lens technique, liquid crystals are aligned according to an electric field generated by electrodes patterned in a liquid crystal cell structure, and a refractive index profile in a form of a GRIN lens appears. Therefore, the 2D/3D image switching can be performed according to a voltage applied to the liquid crystal cell.

However, in the form of the lens array, an electric field profile is preferably formed between the electrodes, but such an electric field profile is not directly above the electrode, and thus, a dead zone occurs between the lens and the lens. Therefore, there is a problem in that a fill-factor is lowered.

In particular, in a case where the lens array structure is applied to a mobile display, since the viewing distance is short, the focal length needs to be short, and thus, the gap of the liquid crystal cells becomes very large. In this case, there is a problem in that a driving voltage and a response speed become large. In addition, generally, as the focal length becomes shorter, an aberration problem arises. In the case of a liquid crystal lens, it is very difficult to solve the aberration problem.

In order to solve these problems, a polarization dependent lens using a liquid crystal phase polymer has been proposed. The polarization dependent lens has a structure in which a liquid crystal phase polymer (reactive mesogen ('RM)) is aligned in the lens structure and is turned on/off according to the polarization of incident light.

In addition to the above-described polarization dependent lens, a polarization switching section capable of adjusting the polarization direction of incident light needs to be provided in order to configure the display. FIG. 1 is a cross-sectional diagram exemplarily illustrating a polarization dependent lens section and a polarization switching section in the related art. Referring to FIG. 1, in the structure in the related art, the polarization dependent lens section and the polarization switching section are separated. In this case, a gap caused by two glass substrates exists between the display panel and the lens.
In a case where the above-described polarization dependent lens is applied to a mobile display, the focal length of the lens needs to be 1 mm or less. As described above, in a case where the polarization dependent lens section and the polarization switching section are separated, the gap caused by two glass substrates exists. As a result, the structure in the related art in which the polarization dependent lens section and the polarization switching section are separated has a problem that it is difficult to apply the structure to a mobile display device.

SUMMARY OF THE INVENTION

Technical Problem

An object of the present invention is to provide an active lens structure in which a polarization switching section and a polarization dependent lens section integrally formed, and a lattice structure of the polarization dependent lens section functions as a liquid crystal alignment film of the polarization switching section, so that the total thickness is minimized.

Another object of the present invention is to provide a method of manufacturing the above-mentioned active lens structure

Solution to Problems

According to an aspect of the present invention, there is provided an active lens structure including: a polarization switching section configured to adjust a voltage applied to selectively convert a polarization direction of incident light; and a polarization dependent lens section configured to be driven by a lens according to the polarization direction of the light incident from the polarization switching section, wherein the polarization dependent lens section includes: an optically isotropic polymer layer having a shape of a reverse lens shape on a first surface; and a liquid crystal phase polymer layer in which the first surface of the optically isotropic polymer layer is filled with photo-curable liquid crystal phase polymers, 1D lattice structures (grooves) are formed on an upper surface, and the liquid crystal phase polymers are aligned along a major axis direction of the lattice structures, and wherein the polarization switching section includes: a first transparent electrode formed in a lattice structure on the upper surface of the liquid crystal phase polymer layer formed in the lattice structure; a second transparent electrode formed on one surface of a transparent substrate and arranged so as to face the first transparent electrode; a liquid crystal layer located between the first transparent electrode and the second transparent electrode; an insulating layer formed in a lattice structure between the first transparent electrode and the liquid crystal layer; and a liquid crystal alignment film formed between the second transparent electrode and the liquid crystal layer for alignment of the liquid crystal layer, a lower portion of the liquid crystal layer being alignment by the lattice structure of the liquid crystal phase polymer layer.

In the active lens structure according to the first aspect, preferably, the polarization dependent lens section may further include an RM alignment film for alignment of the liquid crystal phase polymer on the first surface of the optically isotropic polymer layer.

According to a second aspect of the present invention, there is provided a method of manufacturing an active lens structure, including steps of: (a) fabricating an upper structure; (b) fabricating a lower structure; (c) forming a liquid crystal layer by arranging the upper structure and the lower structure so as to be separated by a predetermined distance from each other and to face each other, performing sealing, and after that, injecting liquid crystal, wherein the step (a) includes: (a1) forming a second transparent electrode by applying a material for a transparent electrode on a transparent substrate; and (a2) forming a liquid crystal alignment film on one surface of the second transparent electrode, and wherein the step (b) includes: (b1) preparing a substrate; (b2) forming an optically isotropic polymer layer having a shape of a reverse lens shape on an upper surface by applying an optically isotropic polymer material on the substrate and, and after, performing imprinting; (b3) forming a photo-curable liquid crystal phase polymer layer having a 1D lattice structure on an upper surface thereof, on the upper surface of the optically isotropic polymer layer; (b4) forming a first transparent electrode by applying a material for a transparent electrode on a surface of the 1D lattice structures of the liquid crystal phase polymer layer; and (b5) forming an insulating layer by applying an insulating material on the first transparent electrode.

In the method of manufacturing the active lens structure according to the second aspect, preferably, the step (b2) may include: applying the optically isotropic polymer material on the substrate; and forming the shape of the reverse lens shape by performing the imprinting on the upper surface of the applied optically isotropic polymer material by using a lens-shaped mold.

In the method of manufacturing the active lens structure according to the second aspect, preferably, the step (b) may further include a step of forming an RM alignment film on the upper surface of the optically isotropic polymer layer between the step (b2) and the step (b3).

Effects of the Invention

The active lens structure according to the present invention has a structure in which a polarization switching section and a polarization dependent lens section are integrally formed, a lattice structure is formed on an upper surface of a liquid crystal phase polymer layer of the polarization dependent lens section, and the liquid crystal phase polymer layer is aligned in a top-down manner and is used as a lower alignment film of the liquid crystal layer. Therefore, the polarization switching section of the active lens structure according to the present invention can be fabricated without the lower alignment film and the lower glass substrate, so that it is possible to minimize the total thickness.

In this manner, by decreasing the total thickness, the active lens structure according to the present invention can be widely used for a mobile display device having a short focal length.

Furthermore, the active lens structure according to the present invention can perform alignment on the lower portion of the liquid crystal layer by using the 1D lattice structures of the liquid crystal phase polymer layer of the polarization dependent lens section without forming the liquid crystal alignment film below the polarization switching section, and thus, a rubbing process for alignment and the like can be omitted, so that it is possible to simplify the manufacturing process.

BEST MODE FOR CARRYING OUT THE INVENTION

An active lens structure according to the present invention has a configuration in which a polarization switching section and a polarization dependent lens section are integrally formed, wherein a lattice structure is formed on an upper surface of a liquid crystal phase polymer layer of the polarization dependent lens section, and the liquid crystal phase polymer layer is aligned in a top-down manner and is used as a lower alignment film of a liquid crystal layer. Therefore, the polarization switching section of the active lens structure according to the present invention can be fabricated without any lower alignment film and any lower glass substrate, so that it is possible to minimize the total thickness and simplifying the manufacturing process.

First Embodiment

Hereinafter, configuration and operation of an active lens structure according to a preferred first embodiment of the present invention will be described in detail with reference to the accompanying drawings.

Figure 1:
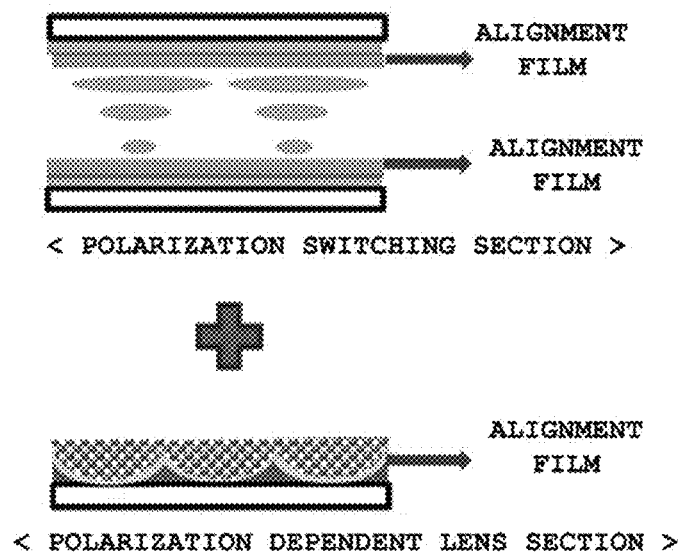
FIG. 1 is a cross-sectional diagram exemplarily illustrating a polarization dependent lens section and a polarization switching section in the related art.
Figure 2:
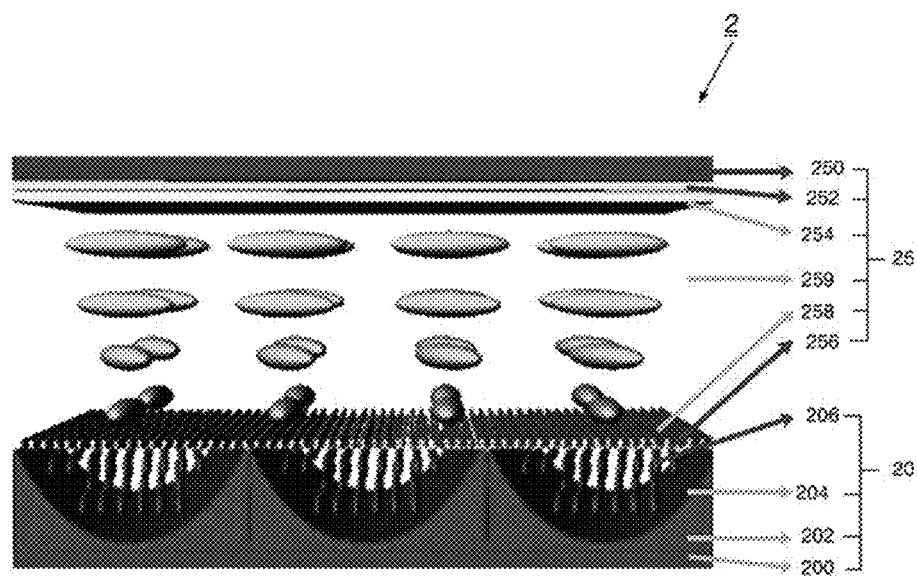
FIG. 2 is a structural diagram illustrating an active lens structure according to a preferred first embodiment of the present invention.
Figure 3:
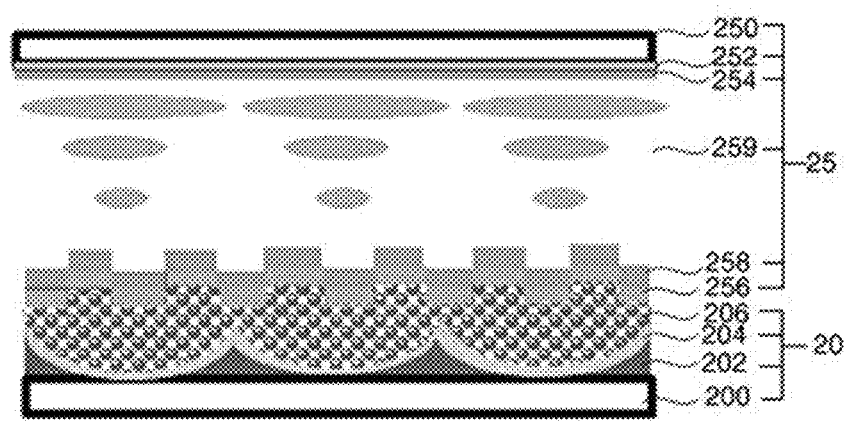
FIG. 3 is a cross-sectional diagram illustrating the active lens structure of FIG. 2.

FIG. 2 is a structural diagram illustrating the active lens structure according to the preferred first embodiment of the present invention, and FIG. 3 is a cross-sectional diagram illustrating the active lens structure of FIG. 2.

Referring to FIGS. 2 and 3, the active lens structure 2 according to the present invention is configured with a polarization dependent lens section 20 and a polarization switching section 25. The polarization switching section 25 is configured to adjust a voltage applied to an electrode, selectively convert a polarization direction of incident light, and output the light to the polarization dependent lens section 20. The polarization dependent lens section 20 is configured to be driven by a lens according to the polarization direction of the light incident from the polarization switching section.

The polarization dependent lens section 20 includes a first transparent substrate 200, an optically isotropic polymer layer 202 formed on the first transparent substrate, an RM alignment film 204 formed on a surface of the optically isotropic polymer layer, and a liquid crystal phase polymer layer 206 formed on the RM alignment film.

As the first transparent substrate 200, one of a glass substrate, a thin film glass substrate, or a film substrate can be selectively used.

The optically isotropic polymer layer 202 is formed on the first transparent substrate 200 and is configured to have a shape of a reverse lens shape on a first surface. The optically isotropic polymer layer 202 may be configured with a reverse shape of a 2D array lens or a 1D array lens. As the 2D array lens, a spherical lens, a hexagonal lens, a square lens, and the like may be exemplified. As the 1D array lens, a cylindrical lens, a Fresnel lens, and the like may be exemplified. FIGS. 2 and 3 exemplarily illustrate a case where the optically isotropic polymer layer is configured with a reverse lens shape. More specifically, FIGS. 2 and 3 exemplarily illustrate a case where the optically isotropic polymer layer is configured with a reverse shape of a cylindrical lens, which is one of 1D lenses. In a case where the optically isotropic polymer layer is configured with a reverse shape of a cylindrical lens, it is preferable that the liquid crystal phase polymer layer is aligned not only in a top-down manner by using a lattice structure but also is aligned in a bottom-up manner by forming an RM alignment film. On the other hand, in a case where the optically isotropic polymer layer is configured with a reverse shape of a Fresnel lens having a relatively thin thickness in comparison with a cylindrical lens, the liquid crystal phase polymer layer can be formed sufficiently only by alignment in a top-down manner by using a lattice structure without a RM alignment film. In this case, since a first liquid crystal phase polymer film is thin, the first liquid crystal phase polymer film can be sufficiently aligned in a top-down manner even by only the lattice structure formed on the upper surface.

The RM alignment film 204 is formed on the first surface of the optically isotropic polymer layer for alignment of the liquid crystal phase polymer layer.

In the liquid crystal phase polymer layer 206, the first surface of the optically isotropic polymer layer on which the RM alignment film is formed is filled with photo-curable liquid crystal phase polymers, nanoscale 1D lattice structures (nano-scale grooves) are formed on the upper surface, and the liquid crystal phase polymers are aligned along a major axis direction of the 1D lattice structures by the 1D lattice structures. The liquid crystal phase polymer layer is formed by aligning the liquid crystal phase monomer applied inside by the RM alignment film and the lattice structures of the upper surface and, after that, performing photo-curing. It is preferable that the ordinary refractive index of the liquid crystal phase polymer layer has an optical refractive index matching condition with respect to an isotropic refractive index of an optically isotropic polymer layer having a reverse lens shape, and the extraordinary refractive index of the liquid crystal phase polymer layer has an optical refractive index mismatching condition with respect to a material of the optically isotropic polymer layer.

In the polarization dependent lens section according to the present invention, in a case where the liquid crystal phase polymer layer is thin, the alignment of the polymer layer can be well induced in a top-down manner by the lattice structure formed on the upper surface of the liquid crystal phase polymer layer without even a separate RM alignment film 204. On the other hand, in a case where the liquid crystal phase polymer layer becomes thick, a top-down manner by the lattice structure and a bottom-up manner by the RM alignment film added below the liquid crystal phase polymer layer may be used simultaneously in order to further improve the alignment of the liquid crystal phase polymer layer. Therefore, as described above, the RM alignment film 204 may be further provided.

The polarization switching section 25 includes a second transparent substrate 250, a first transparent electrode 256, a second transparent electrode 252, a liquid crystal alignment film 254, an insulating layer 258, and a liquid crystal layer 259.

The first transparent electrode 256 is formed by applying or coating a transparent electrode material on the upper surface of the liquid crystal phase polymer layer formed in the lattice structure and is formed in the same lattice structure as the liquid crystal phase polymer layer.

The second transparent electrode 252 is formed on one surface of the second transparent substrate 250 and is arranged to face the first transparent electrode. As the second transparent substrate of the polarization switching section, a glass substrate, a thin film glass substrate, or a film substrate may be used.

The liquid crystal layer 259 is located between the first transparent electrode and the second transparent electrode. It is preferable that the active lens structure according to the present invention is configured so that the refractive index of the liquid crystal phase polymer layer and the refractive index of the liquid crystal layer are matched with each other, and a diffraction pattern generated by the lattice structure is spontaneously removed.

The insulating layer 258 is formed between the first transparent electrode and the liquid crystal layer in order to prevent electric charges from escaping when the voltage is on. Since the insulating layer is formed by applying or coating an insulating material on the first transparent electrode, it is preferably that the insulating layer is formed with the same lattice structure as the first transparent electrode. The first transparent electrode and the insulating layer formed in the lattice structure function as lower alignment films for the liquid crystal layer of the polarization switching section.

The liquid crystal alignment film 254 is formed as an upper alignment film of the liquid crystal layer 259 between the second transparent electrode and the liquid crystal layer.

As described above, the active lens structure according to the present invention can reduce the gap between the display panel and the lens by thickness of one glass substrate in comparison with the structure in the related art in which the polarization dependent lens section and the polarization switching section are separated. In general, since the thickness of one glass substrate is 500 µm to 700 µm, the active lens structure according to the present invention can reduce the gap of about 500 µm to 700 µm in comparison with the structure in the related art.

Hereinafter, the alignment process by the 1D lattice structure used in the active lens structure according to the present invention will be described in detail.

According to the Berreman effect, the liquid crystal molecules on a surface of the 1D lattice structure are aligned in the direction of the 1D lattice structure in order to minimize a surface free energy density, and the surface free energy density at this time is expressed by Mathematical Formula 1.

$$f_s = \frac{1}{4} K A^2 \left(\frac{2\pi}{\lambda}\right)^3 \sin^2 \phi \quad \text{[Mathematical Formula 1]}$$

Herein, K represents an elastic constant of a liquid crystal molecule, A represents a step difference of a 1D lattice structure, and λ represents a period of a 1D lattice structure. φ represents an angle between a liquid crystal molecular axis direction and a lattice direction of the 1D lattice structure. Herein, it can be understood that, when φ becomes zero, that is, when the liquid crystal molecules are aligned in the 1D lattice structure direction, the surface free energy density is minimized. The fixed energy in the azimuth direction indicating a liquid crystal molecular alignment power at the surface of the 1D lattice structure is expressed by Mathematical Formula 2.

$$W = \frac{1}{2} K A^2 \left(\frac{2\pi}{\lambda}\right)^3 \quad \text{[Mathematical Formula 2]}$$

From Mathematical Formula 2, it can be understood that the liquid crystal molecular alignment power is proportional to a square of the step difference of the 1D lattice structure and inversely proportional to a cubic of the period.

Likewise, photo-curable liquid crystal phase monomers are also aligned in the direction of the 1D lattice structure to minimize the surface free energy density on the surface of the 1D lattice structure. At this time, the value of $A^2/\lambda^3$ of the 1D lattice structure is preferably 1000 m$^{-1}$ or more.

Figure 4:
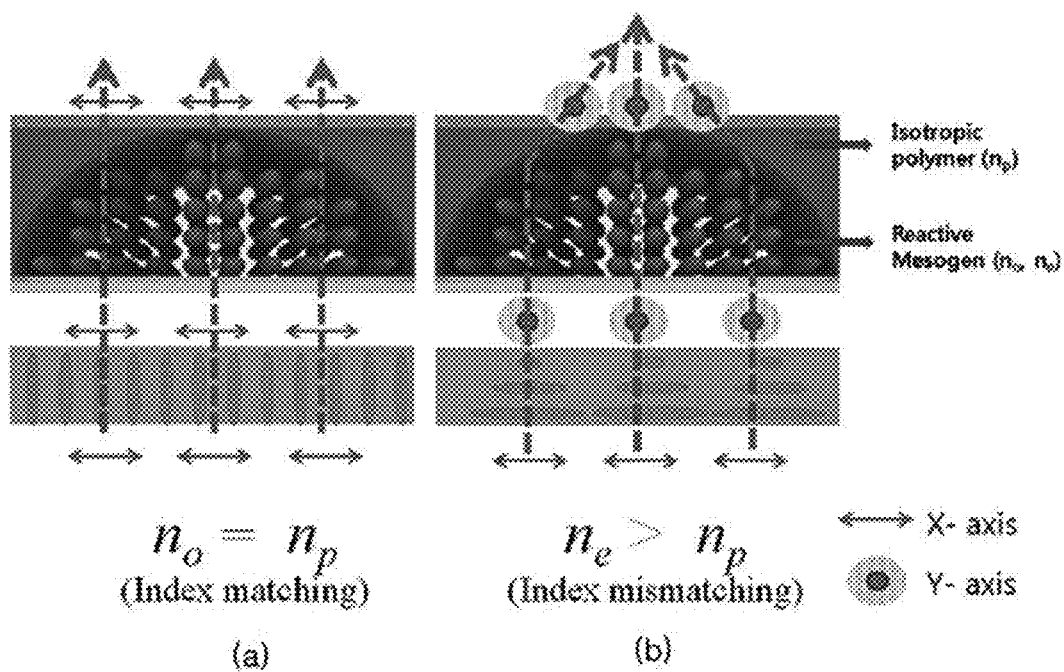
FIG. 4 is a schematic diagram illustrating an operation of the active lens structure according to the preferred first embodiment of the present invention.

FIG. 4 is a schematic diagram illustrating an operation of the active lens structure according to the preferred first embodiment of the present invention.

Referring to FIG. 4, the polarization dependent lens has a structure in which a liquid crystal phase polymer (reactive mesogen (RM)) is aligned in an optically isotropic polymer layer, which is a lens structure, and is turned on/off according to the polarization of incident light. In general, the refractive index of the RM is determined as a refractive index of $n_e$ or $n_o$ according to the polarization of the incident light having birefringence characteristics, when the major axis refractive index of the RM in a rod shape is denoted by $n_e$, and the minor axis refractive index is denoted by $n_o$. As illustrated in (a) of FIG. 4, in a case where the polarization direction of the incident light in the ON state in which the voltage is applied coincides with the minor axis direction, the refractive index of the RM is $n_o$, which is matched with the refractive index $n_p$ of the lens structure, and the lens function disappears. As a result, a 2D image can be output. On the other hand, as illustrated in (b) of FIG. 4, in a case where the polarization direction of the incident light in the OFF state in which no voltage is applied coincides with the major axis direction, the refractive index of the RM is $n_e$, which is mismatched with the refractive index $n_p$ of the lens structure. As a result, a 3D image can be output.

Hereinafter, the focal length and focusing characteristics of the active lens structure according to the present invention will be described. Since the focal length of the active lens structure according to the present invention is very short, it is very difficult to directly measure the focal length of the active lens structure. Therefore, a lens is additionally arranged between the polarization dependent liquid crystal lens to be measured and the CCD, which is a detector, and thus, in a state where the focal length of the entire lens optical system is increased, measurement is performed. After that, the focal length of polarization dependent liquid crystal lens can be obtained through calculation.

Figure 5:
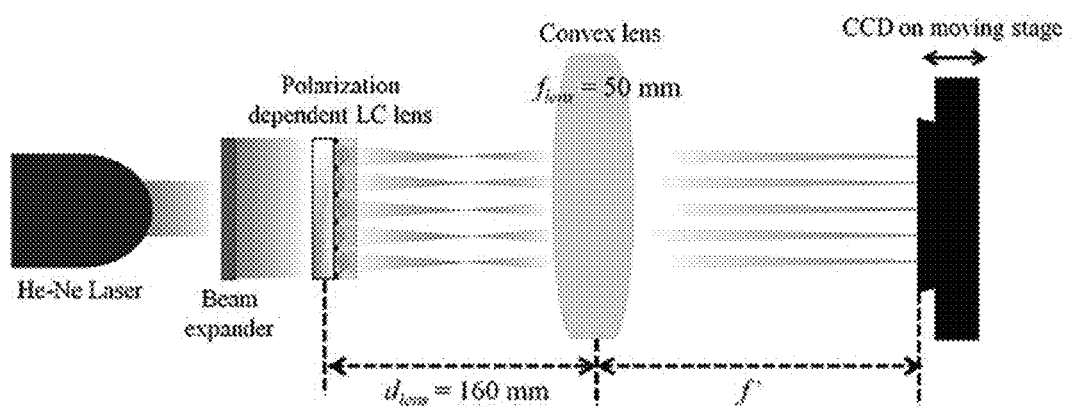
FIG. 5 is a diagram illustrating a concept of measuring a focal length of a lens structure in the active lens structure according to the preferred first embodiment of the present invention.

FIG. 5 is a diagram illustrating a concept of measuring a focal length of a lens structure in the active lens structure according to the preferred first embodiment of the present invention. Referring to FIG. 5, a He—Ne laser with a wavelength of 633 nm is used as a light source. After a distance between the polarization dependent liquid crystal lens to be measured and a lens having a focal length of 50 mm is set to a distance of 160 mm, the f' value is measured by searching a focal plane while moving the CCD.

Herein, the focal image is obtained at f'=73 mm, and the defocusing state is checked by switching the liquid crystal at that position. A mathematical formula in the lens optical system using two lenses can be expressed by Mathematical Formula 3.

$$f' = \frac{f_{lens}(d_{lens} - f)}{d_{lens} - (f_{lens} + f)} \quad \text{[Mathematical Formula 3]}$$

Herein, $f_{lens}$=50 mm, $d_{lens}$=160 mm, and a measured f'=73 mm, and the focal length f=1.3 mm of the fabricated polarization dependent liquid crystal lens is calculated by Mathematical Formula 3.

Figure 6:
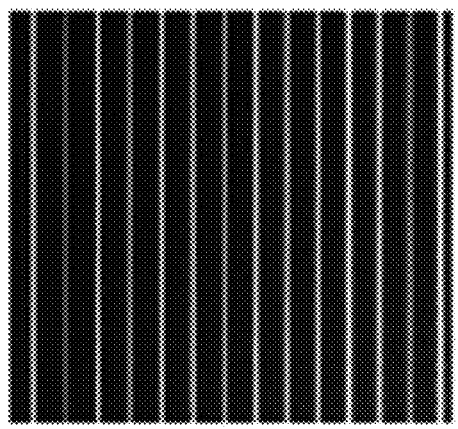
FIG. 6 illustrates focus images measured with a CCD in a focal plane according to an experiment of FIG. 5, (a) is a focus image in a 3D mode and a field ON state, and (b) is a focus image in a 2D mode and a field OFF state.
Figure 6:
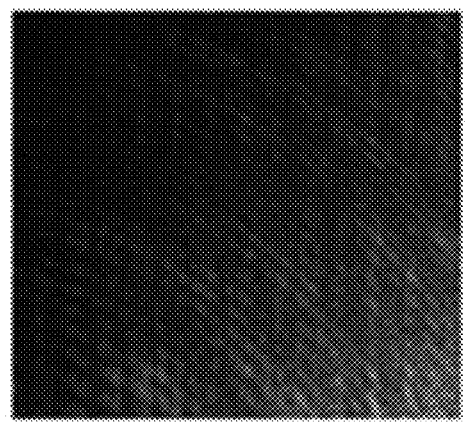

FIG. 6 illustrates focus images measured with the CCD in the focal plane according to the experiment of FIG. 5, (a) is a focus image in a 3D mode and a field ON state, and (b) is a focus image in a 2D mode and a field OFF state.

Hereinafter, the method of manufacturing the active lens structure according to the present invention having the above-described structure will be described in detail.

Figure 7:
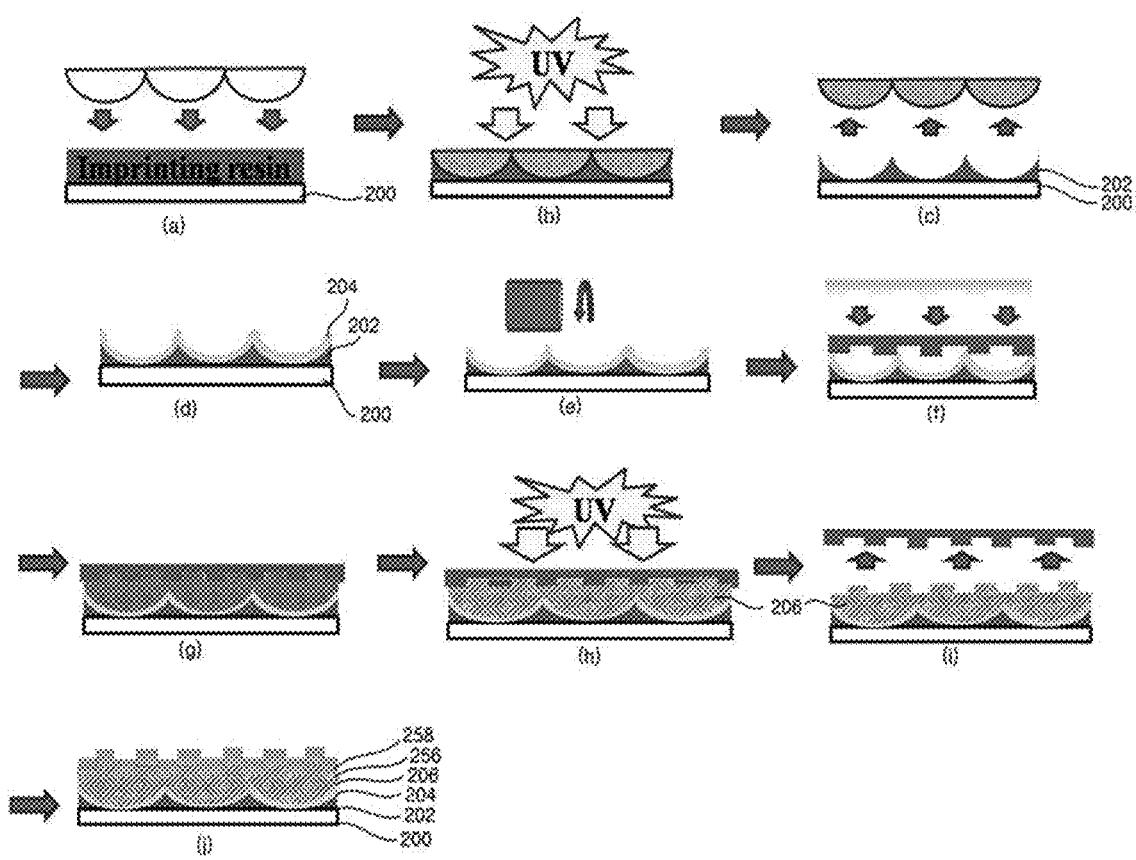
FIG. 7 is a flowchart illustrating a process of fabricating a lower structure in the method of manufacturing the active lens structure according to the present invention.
Figure 8:
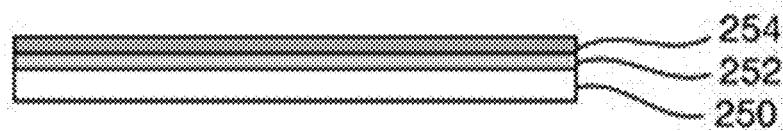
FIG. 8 is a flowchart illustrating a process of fabricating an upper structure in the method of manufacturing the active lens structure according to the present invention.
Figure 9:
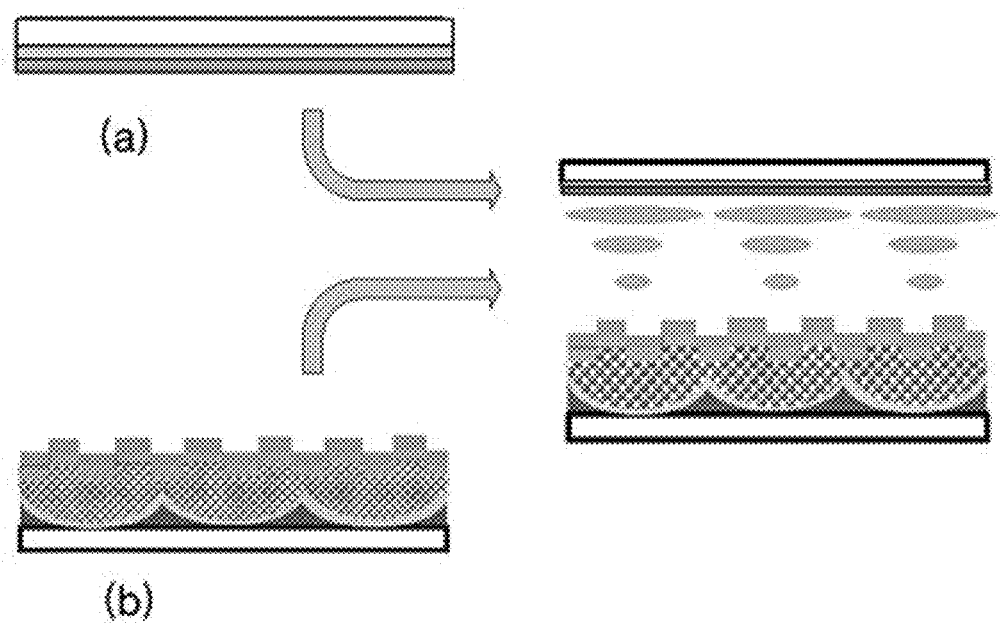
FIG. 9 is a state diagram of the active lens structure completed by separating the upper structure and the lower structure from each other, performing sealing, and injecting liquid crystal.

FIG. 7 is a flowchart illustrating a process of fabricating a lower structure in the method of manufacturing the active lens structure according to the present invention. FIG. 8 is a flowchart illustrating a process of fabricating an upper structure in the method of manufacturing the active lens structure according to the present invention. FIG. 9 is a state diagram of the active lens structure completed by separating the upper structure and the lower structure from each other, performing sealing, and injecting liquid crystal.

First, referring to FIG. 7, the lower structure is a structure in which the first transparent electrode and the insulating layer of the polarization switching section are formed in the polarization dependent lens section. First, a liquid crystal phase polymer and a polymer material having optical isotropy are coated on the first transparent substrate 200, an imprinting is performed by using a lens-shaped mold, photo-curing is performed by UV irradiation, and then the mold is removed, so that the optically isotropic polymer layer 202 having a structure of a reverse lens shape is formed on the upper surface (steps a to c).

Figure 10:
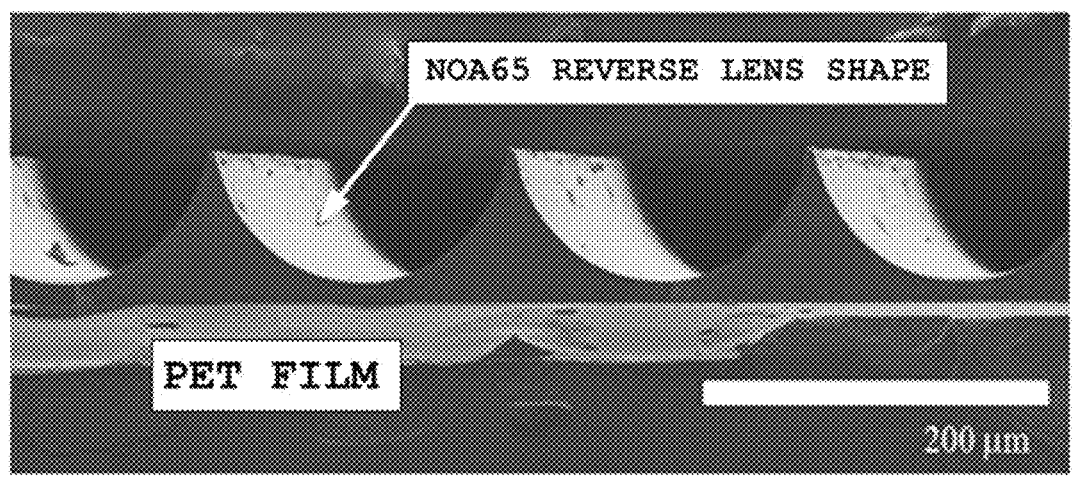
FIG. 10 is an SEM sectional image of a 1D array micro lens structure having a structure of a reverse lens shape fabricated by an imprinting technology in the method of manufacturing the active lens structure according to the preferred first embodiment of the present invention.

FIG. 10 is an SEM sectional image of a 1D array micro lens structure having a structure of a reverse lens shape fabricated by an imprinting technology in the method of manufacturing the active lens structure according to the preferred first embodiment of the present invention.

Next, an alignment material for the RM alignment is spin-coated on the surface of the optically isotropic polymer layer, and heat treatment is performed. After that, a rubbing process is performed in the direction of aligning the photo-curable liquid crystal phase polymer material to perform the alignment process, so that the RM alignment film 204 is formed (steps d and e). In general, in a case where the first transparent substrate is a film substrate, a polyimide used for liquid crystal alignment cannot be applied because a high-temperature heat treatment of about 230° C. to 250° C. is required for polymerization. Therefore, it is preferable to use polyvinylachol (PVA) which can be subjected to a low temperature process at 90° C. to 100° C. and is dissolved in DI water which is a polar solvent. In a case where the PVA is used as the RM alignment film, it is preferable to perform UV ozone treatment to hydrophilize the surface of the reverse lens shape of the optically isotropic polymer layer in order to improve the PVA coating property. In addition, after a PVA alignment film having a thickness of 200 nm is formed, the alignment is induced by rubbing with a rubbing machine.

On the other hand, as described above, not only the alignment can be performed by the rubbing process, but a photo alignment process may also be performed depending on the alignment film material.

Figure 11:
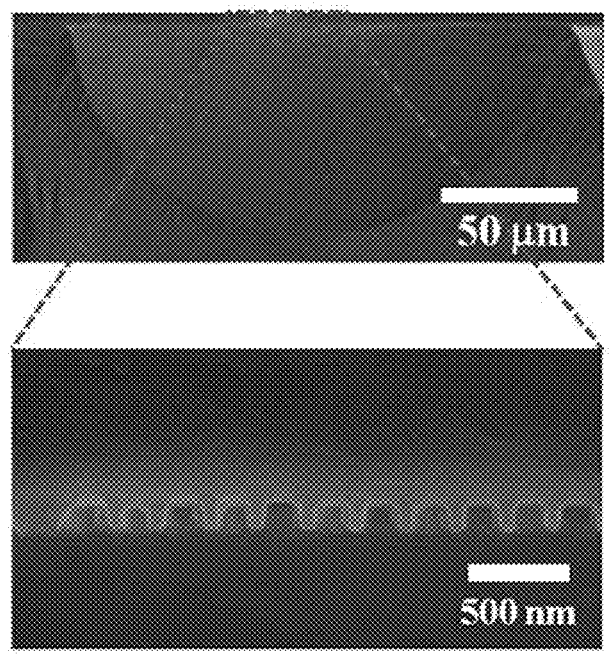
FIG. 11 is an SEM image of a liquid crystal phase polymer layer having a 1D lattice structure formed on an upper surface of the active lens structure according to the preferred first embodiment of the present invention.

Next, a mold having a 1D lattice structure is arranged on the upper surface of the optically isotropic polymer layer, a liquid crystal phase monomer (RM) material is injected between the structure of the reverse lens shape of the optically isotropic polymer layer and the mold by using a capillary phenomenon or a liquid crystal phase material is applied to the optically isotropic polymer layer, the 1D lattice structure is covered (a one drop filling method), and the liquid crystal phase monomer is thermally treated at a temperature of 50° C. for 30 minutes, photopolymerization is performed at a temperature of 35° C., and after that, the lattice structure is removed, so that a liquid crystal phase polymer layer 206 is formed (steps f to i). FIG. 11 is an SEM image of the liquid crystal phase polymer layer having a 1D lattice structure formed on the upper surface of the active lens structure according to the preferred first embodiment of the present invention.

Next, a first transparent electrode 256 is formed by applying a transparent electrode material on the upper surface of the liquid crystal phase polymer layer 206 in which the 1D lattice structure is formed, and an insulating layer 258 is formed by applying a transparent insulating material on the first transparent electrode (step j), so that the lower structure is formed.

Next, referring FIG. 8, the upper structure includes a second transparent electrode 252 and a liquid crystal alignment film 254 sequentially formed on a transparent substrate 250. The process of fabricating the upper structure will be described in detail. First, a second transparent electrode 252 is formed by applying a transparent electrode material on the transparent substrate 250, and a liquid crystal alignment film 254 is formed by applying a liquid crystal alignment material on the second transparent electrode and, after that, performing rubbing, so that the upper structure is formed.

Next, referring to FIG. 9, the lower structure of FIG. 7 and the upper structure of FIG. 8 are arranged to be separated by a predetermined distance from each other so that the insulating layer of the lower structure and the liquid crystal alignment film of the upper structure face each other, sealing is performed, and after that, liquid crystal is injected therebetween, so that the active lens structure according to the present invention is formed.

Figure 12:
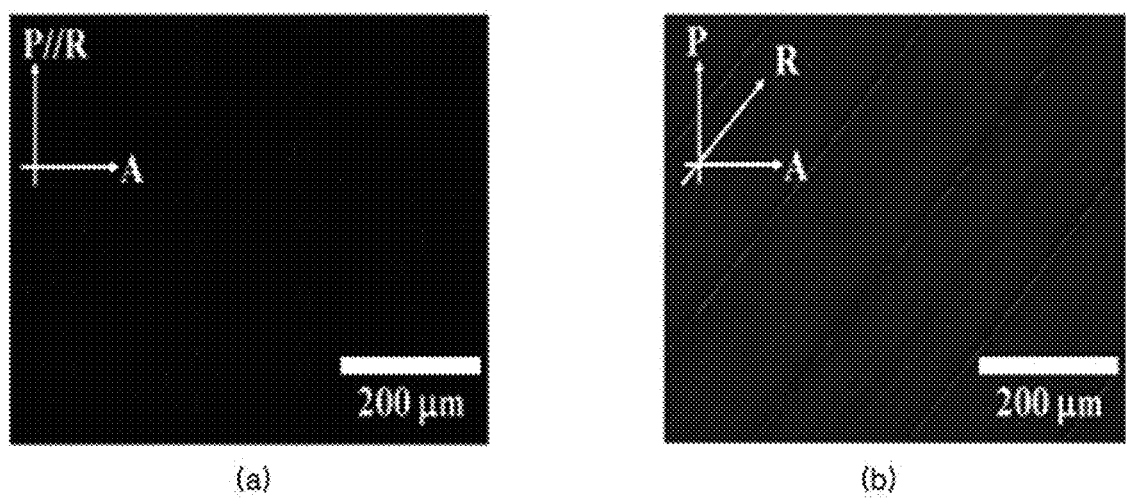
FIG. 12 is a microscope image observed on a crossed polarizer of a polarization dependent lens section manufactured according to the method of manufacturing the active lens structure according to the preferred first embodiment of the present invention.

FIG. 12 is a microscope image observed on a crossed polarizer of the polarization dependent lens section manufactured according to the method of manufacturing the active lens structure according to the preferred first embodiment of the present invention. Referring to FIG. 12, it can be seen through a polarizing microscope that the RM material of the active lens structure formed on a PET film is aligned on a crossed polarizer. As illustrated in (a), when the polarization direction and the rubbing direction coincide with each other, retardation does not occur, so that a dark state is obtained. As illustrated in (b), when the polarization direction and the rubbing direction have an angle of 45 degrees, retardation occurs, and thus, light leaks. Due to the lens structure, the height is different, and thus, the amount of retardation is different according to the position. As a result, it can be seen that a stripe pattern is formed.

DETAILED DESCRIPTION OF THE INVENTION

Second Embodiment

Figure 13:
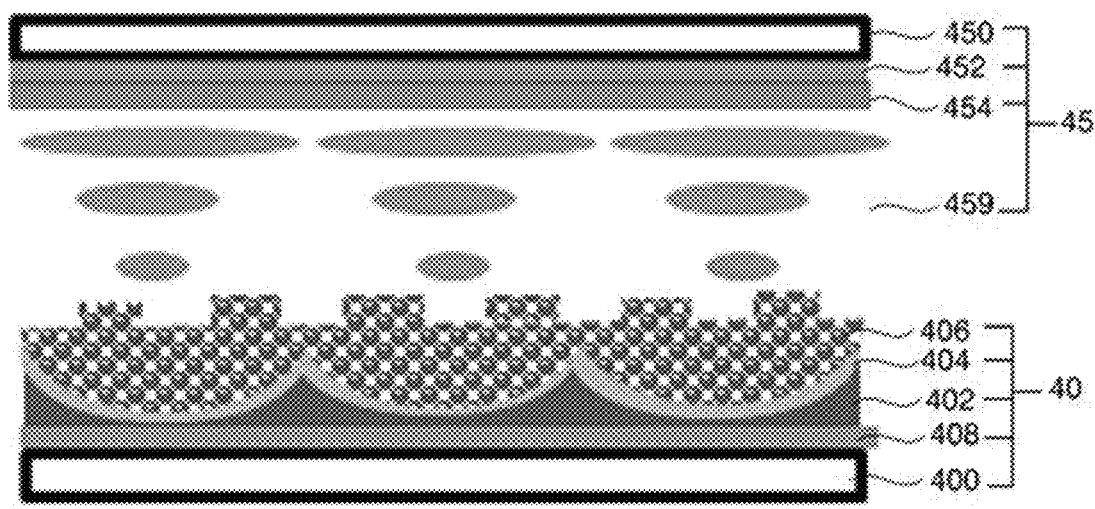
FIG. 13 is a cross-sectional diagram illustrating an active lens structure according to a second embodiment of the present invention.

Hereinafter, configuration and operation of an active lens structure according to a second embodiment of the present invention will be described in detail with reference to the accompanying drawings. FIG. 13 is a cross-sectional diagram conceptually illustrating the active lens structure according to the second embodiment of the present invention.

Referring to FIG. 13, the active lens structure 4 according to this embodiment is configured with a polarization dependent lens section 40 and a polarization switching section 45. The polarization switching section 45 is configured to adjust a voltage applied to an electrode to selectively convert a polarization direction of incident light and output the light to the polarization dependent lens section 40. The polarization dependent lens section 40 is configured to be driven by a lens according to the polarization direction of the light incident from the polarization switching section.

The polarization dependent lens section 40 includes a first transparent substrate 400, a first transparent electrode 408 formed on the first transparent substrate, an optically isotropic polymer layer 402 formed on the first transparent substrate, an RM alignment film 404 formed on a surface of the optically isotropic polymer layer, and a liquid crystal phase polymer layer 406 formed on the RM alignment film.

The polarization switching section 45 includes a second transparent substrate 450, a second transparent electrode 452, a liquid crystal alignment film 454, and a liquid crystal layer 459.

In the active lens structure according to this embodiment, all the components except for the first transparent electrode are the same as the corresponding components in the preferred first embodiment, and thus, duplicate description thereof will be omitted. The active lens structure according to the second embodiment is similar to the active lens structure according to the preferred first embodiment except that the first transparent electrode 408 for applying a voltage to the liquid crystal of the liquid crystal layer 459 is formed on the first transparent substrate 400 of the polarization dependent lens section 40. Unlike the active lens structure according to the preferred first embodiment, in the active lens structure according to the second embodiment, the first transparent electrode is formed on the first transparent substrate, so that there is not a process of coating a transparent electrode layer and an insulating layer on the liquid crystal phase polymer layer 406. Therefore, not only the overall structure is simple, but also the manufacturing process can be simplified.

However, in the active lens structure according to this embodiment, the polarization dependent lens section is located between the first transparent electrode and the second transparent electrode, so that a driving voltage may be increased in comparison with the active lens structure according to the preferred first embodiment.

Hereinafter, a method of manufacturing the active lens structure according to the second embodiment of the present invention having the above-described structure will be described in detail.

In the active lens structure according to this embodiment, the lower structure and the upper structure are individually fabricated. The lower structure and the upper structure are arranged to be separated by a predetermined distance from each other, sealing is performed, and after that, liquid crystal is injected therebetween to form a liquid crystal layer, so that the active lens structure is formed.

Hereinafter, a process of fabricating the lower structure and the upper structure will be described.

First, the lower structure is a structure in which a polarization dependent lens section is formed.

First, a first transparent electrode 408 is formed on the first transparent substrate 400.

Next, a liquid crystal phase polymer and a polymer material having optical isotropy are coated on the first transparent substrate, an imprinting is performed by using a lens-shaped mold, photo-curing is performed by UV irradiation, and then the mold is removed, so that the optically isotropic polymer layer 402 having a structure of a reverse lens shape is formed on the upper surface Next, an alignment material for the RM alignment is spin-coated on the surface of the optically isotropic polymer layer, and heat treatment is performed. After that, a rubbing process is performed in the direction of aligning the photo-curable liquid crystal phase polymer material to perform the alignment process, so that the RM alignment film 404 is formed. In general, in a case where the first transparent substrate is a film substrate, a polyimide used for liquid crystal alignment cannot be applied because a high-temperature heat treatment of about 230° C. to 250° C. is required for polymerization. Therefore, it is preferable to use polyvinylachol (PVA) which can be subjected to a low temperature process at 90° C. to 100° C. and is dissolved in DI water which is a polar solvent. In a case where the PVA is used as the RM alignment film, it is preferable to perform UV ozone treatment to hydrophilize the surface of the reverse lens shape of the optically isotropic polymer layer in order to improve the PVA coating property. In addition, after a PVA alignment film having a thickness of 200 nm is formed, the alignment is induced by rubbing with a rubbing machine.

On the other hand, as described above, not only the alignment can be performed by the rubbing process, but a photo alignment process may also be possible depending on the alignment film material.

Next, a mold having a 1D lattice structure is arranged on the upper surface of the optically isotropic polymer layer, a liquid crystal phase monomer (RM) material is injected between the structure of the reverse lens shape of the optically isotropic polymer layer and the mold by using a capillary phenomenon or a liquid crystal phase material is applied to the optically isotropic polymer layer, the 1D lattice structure is covered (a one drop filling method), and the liquid crystal phase monomer is thermally treated at a temperature of 50° C. for 30 minutes, photopolymerization is performed at a temperature of 35° C., and after that, the lattice structure is removed, so that a liquid crystal phase polymer layer 406 is formed Next, the upper structure is configured with a second transparent electrode 452 and a liquid crystal alignment film 454 sequentially formed on the transparent substrate 450. The process of fabricating the upper structure will be described in detail. First, a second transparent electrode 452 is formed by applying a transparent electrode material on the transparent substrate 450, and a liquid crystal alignment film 454 is formed by applying a liquid crystal alignment material on the second transparent electrode and, after that, performing rubbing, so that the upper structure is formed.

Next, the lower structure and the upper structure are arranged to be separated by a predetermined distance from each other so that the liquid crystal phase polymer layer 406 of the lower structure and the liquid crystal alignment film 454 of the upper structure face each other, sealing is performed, and after that, liquid crystal is injected therebetween, so that the active lens structure according to the present invention is formed.

While the present invention has been particularly illustrated and described with reference to the preferred first embodiment thereof, it should be understood by the skilled in the art that the invention is not limited to the disclosed embodiments, but various modifications and applications not illustrated in the above description can be made without departing from the spirit of the invention. In addition, differences relating to the modifications and applications should be construed as being included within the scope of the invention as set forth in the appended claims.

INDUSTRIAL APPLICABILITY

An active lens structure according to the present invention can be widely used in stereoscopic display devices.

The invention claimed is:

1. An active lens structure comprising:
a polarization switching section configured to adjust a voltage applied to selectively convert a polarization direction of incident light; and
a polarization dependent lens section configured to be driven by a lens according to the polarization direction of the light incident from the polarization switching section,
wherein the polarization dependent lens section includes:
an optically isotropic polymer layer having a shape of a reverse lens shape on a first surface; and
a liquid crystal phase polymer layer in which the first surface of the optically isotropic polymer layer is filled with photo-curable liquid crystal phase polymers, 1-dimensional lattice structures (grooves) are formed on an upper surface, and the liquid crystal phase polymers are aligned along a major axis direction of the lattice structures, and
wherein the polarization switching section includes:
a first transparent electrode formed in a lattice structure on the upper surface of the liquid crystal phase polymer layer formed in the lattice structure;
a second transparent electrode formed on one surface of a transparent substrate and arranged so as to face the first transparent electrode;
a liquid crystal layer located between the first transparent electrode and the second transparent electrode;
an insulating layer formed in a lattice structure between the first transparent electrode and the liquid crystal layer; and
a liquid crystal alignment film formed between the second transparent electrode and the liquid crystal layer for alignment of the liquid crystal layer, a lower portion of the liquid crystal layer being alignment by the lattice structure of the liquid crystal phase polymer layer.

2. The active lens structure according to claim 1, wherein the polarization dependent lens section further includes an RM alignment film for alignment of the liquid crystal phase polymer on the first surface of the optically isotropic polymer layer.

3. The active lens structure according to claim 1, wherein a refractive index of the liquid crystal phase polymer layer and a refractive index of the liquid crystal layer are matched with each other.

4. A method of manufacturing an active lens structure, comprising steps of:
(a) fabricating an upper structure;
(b) fabricating a lower structure;
(c) forming a liquid crystal layer by arranging the upper structure and the lower structure so as to be separated by a predetermined distance from each other and to face each other, performing sealing, and after that, injecting liquid crystal,
wherein the step (a) includes:
(a1) forming a second transparent electrode by applying a material for a transparent electrode on a transparent substrate; and
(a2) forming a liquid crystal alignment film on one surface of the second transparent electrode, and
wherein the step (b) includes:
(b1) preparing a substrate;
(b2) forming an optically isotropic polymer layer having a shape of a reverse lens shape on an upper surface by applying an optically isotropic polymer material on the substrate and, and after, performing imprinting;
(b3) forming a photo-curable liquid crystal phase polymer layer having a 1D lattice structure on an upper surface thereof, on the upper surface of the optically isotropic polymer layer;
(b4) forming a first transparent electrode by applying a material for a transparent electrode on a surface of the 1D lattice structures of the liquid crystal phase polymer layer; and
(b5) forming an insulating layer by applying an insulating material on the first transparent electrode.

5. The method of claim 4, wherein the step (b2) includes:
applying the optically isotropic polymer material on the substrate; and
forming the shape of the reverse lens shape by performing the imprinting on the upper surface of the applied optically isotropic polymer material by using a lens-shaped mold.

6. The method of claim 4, wherein the step (b3) includes steps of:
arranging a mold having a 1D lattice structure on the upper surface of the optically isotropic polymer layer,
injecting a liquid crystal phase monomer (RM) material between the structure of the reverse lens shape of the optically isotropic polymer layer and the mold by using a capillary phenomenon or applying the liquid crystal phase monomer material on the optically isotropic polymer layer, and after that, performing covering the 1D lattice structure;
forming a liquid crystal phase polymer layer by photo-curing the liquid crystal phase monomer material; and
removing the mold of the lattice structure.

7. The method according to claim 4, wherein the step (b) further includes a step of forming an RM alignment film on the upper surface of the optically isotropic polymer layer between the step (b2) and the step (b3).

8. The method according to claim 4, wherein a refractive index of the liquid crystal phase polymer layer and a refractive index of the liquid crystal layer are matched with each other.

* * * * *